United States Patent [19]
Latham

[11] Patent Number: 5,866,175
[45] Date of Patent: Feb. 2, 1999

[54] STRETCH BLOW MOLDING MACHINE MONITORING SYSTEM

[76] Inventor: Greig S. Latham, 1006 Edgemont Ct., Allen, Tex. 75013-3635

[21] Appl. No.: 905,070

[22] Filed: Aug. 1, 1997

[51] Int. Cl.⁶ .......................... B29C 49/36; B29C 49/78
[52] U.S. Cl. ..................... 425/170; 425/171; 425/529; 425/533; 425/540
[58] Field of Search ........................ 425/529, 533, 425/170, 171, 540

[56] References Cited

U.S. PATENT DOCUMENTS

| | | | |
|---|---|---|---|
| 3,097,398 | 7/1963 | Inglesby | 425/170 |
| 3,737,275 | 6/1973 | Kontz | 425/536 |
| 3,752,627 | 8/1973 | Bourgeois et al. | 425/298 |
| 4,021,517 | 5/1977 | Schmidt et al. | 264/528 |
| 4,372,735 | 2/1983 | Collette | 425/529 |
| 4,826,418 | 5/1989 | Kamiguchi | 425/170 |
| 5,169,705 | 12/1992 | Coxhead et al. | 425/150 |
| 5,244,610 | 9/1993 | Kitzmiller | 425/540 |
| 5,269,672 | 12/1993 | DiGangi, Jr. | 425/529 |
| 5,322,651 | 6/1994 | Emmer | 425/526 |
| 5,470,216 | 11/1995 | Hillman et al. | 425/144 |
| 5,572,816 | 11/1996 | Anderson, Jr. et al. | 40/505 |

*Primary Examiner*—Robert Davis
*Attorney, Agent, or Firm*—Locke Purnell Rain Harrell

[57] ABSTRACT

A system for monitoring a stretch blow molding machine includes devices for monitoring the position of a stretch rod with respect to a mold, an air pressure sensor for monitoring air pressure introduced through the stretch rod, and a sensor for monitoring temperature of fluid within a fluid cavity for chilling the mold. The system includes a display for monitoring position data, pressure data, and temperature data generated by the respective sensors.

2 Claims, 1 Drawing Sheet

STRETCH BLOW MOLDING MACHINE MONITORING SYSTEM

TECHNICAL FIELD OF THE INVENTION

The present invention relates to stretch blow molding machines, and more particularly to a system for monitoring workstation parameters.

BACKGROUND OF THE INVENTION

Hollow, plastic containers are typically manufactured using a stretch blow molding machine. A plastic preform or parison is created utilizing an extruder, in an injection-molding operation. The parisons are conveyed to the stretch blow molding machine and inspected by automated visual scanners to detect irregularities. Any parisons failing to meet preprogrammed criterion are rejected before being loaded into the stretch blow molding machine. In general, the first step of the stretch blower molding process is to heat the parison in an oven upstream from the stretch blow molding machine rotary table. The parisons are conveyed through the oven and heated while moving continuously through the oven. Typically, the heated parison is transferred to the rotary stretch blow molding machine load station. The load station includes rotating arms that grasp the parison and place the parison in the two-piece mold cavity. The load station is synchronized With the stretch blow molding machine wheel and the mold closes around the parison after the parison is loaded.

As the wheel continues to rotate, the stretch rod is driven down through the neck of the parison. When the stretch rod is moving down, low-pressure air (typically 150 psi) is introduced into the parison via the hollow stretch rod. Some time after the stretch rod reaches its maximum extension or stroke, high pressure process air (typically 600 psi) is applied to the inside of the parison to force the heated plastic against the mold surrounding the parison. The mold is typically cooled by chilled process water circulated in the jacketed mold. The high-pressure process air is applied to the now formed bottle for a portion of the wheel's revolution to allow the bottle to cool.

After the cooling interval, the center rod retracts and the air seal is broken allowing the process air to exhaust. The stretch rod retracts to the fully retracted position before the mold opens to expose the bottle for extraction. The extraction or unload station is synchronized to the stretch blow molding machine wheel and transfers the bottle from the wheel to the exit conveyor. The exit conveyor transports the bottle to another inspection station and then on to a palletizer.

Stretch blow molding machines are available in many configurations ranging from two stations to 40 or more stations. Previously, there has been no way to monitor specific process parameters at the individual stations used to produce a bottle. Previous systems were only able to monitor process parameters as they related to all stations on a wheel. Process air pressure and water values could only be determined at the manifold level. There was no method to monitor the displacement of the stretch rod. Station molds, stretch rods, valves, seals and other unique components wear at different rates, are subject to different alignment errors during normal operation, mold changes and routine maintenance activities. These differences affect the quality of bottles produced. Significant station to station differences are difficult or impossible to detect during continuous production. Quality problems are detected only during random quality control samples. If a bad bottle is found during this quality check, it is impossible to determine how many out of specification bottles have been produced.

A stretch blow molding machine may produce as many as 30,000 or more bottles per hour. The wheel is totally enclosed by safety walls and doors. The high angular velocities make it difficult to visually observe station actions without the use of a strobe light. Very small process changes negatively affect the quality of the bottle. Most of these process changes are not detectable external to the machine. Even if slip rings were employed to provide power to the wheel, communicating across these rings severely limits the data through put due to the high noise margin induced by slip ring brushes.

A need has thus arisen for a system for monitoring workstation parameters of a stretch blow molding machine.

SUMMARY OF THE INVENTION

The present invention allows for the monitoring of critical blow mold parameters to determine in real time, during continuous process operations which workstations are producing out of specification bottles by monitoring the processes used to fabricate the bottle. Transducers continuously monitor the process parameters. The controller senses the speed of the stretch blow molding machine and dynamically changes the interrupt interval to ensure the transducer sampling is synchronized to the angular velocity of the wheel. The controller is able to process the data and detect an out of tolerance condition. A profile of the process parameters is transmitted to a computer to create graphs for detailed analysis. Key data is also trended in graphical and tabular form for historical and statistical analysis purposes.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
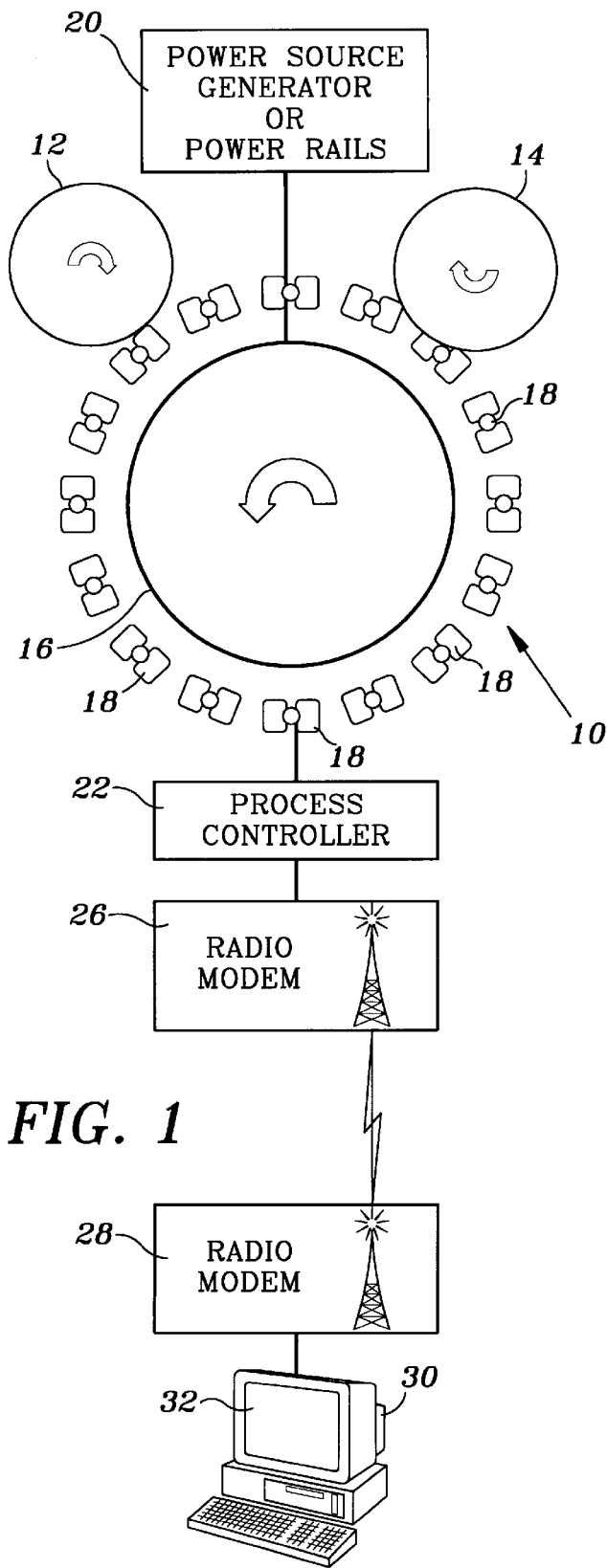
FIG. 1 is a schematic block diagram of a stretch blow molding machine illustrating the present invention.

Referring to FIG. 1, a block diagram of an exemplary stretch blow molding machine is illustrated, and is generally identified by the numeral 10. Stretch blow molding machine 10 includes a load station 12, an unload station 14, a wheel 16, and a plurality of workstations 18.

Load station 12 moves plastic preforms or parisons from an upstream oven onto stretch blow molding machine 10. Load station 12 is synchronized with the rotation of stretch blow molding machine wheel 16 so as to move the parisons effectively, regardless of the running speed of machine 10. Machine 10 includes blow-molding workstations 18 mounted around the periphery of wheel 16. Workstations 18 will be further described with respect to FIG. 2.

Machine 10 is powered from a power source 20 including a permanent magnet dc motor and a dc-to-dc converter or power rails fitted to the machine 10.

Data acquired from the plurality of workstations 18 is collected and processed by a process controller 22. Controller 22 transmits data from a display buffer to a radio modem 26. Radio modem 26 is mounted on machine 10 and communicates with a second radio modem 28. Radio modem 28 is stationary and is located at a remote site for communication of data to a computer 30 having a display 32. Computer 30 and display 32 display graphic representation of data collected by controller 22.

Figure 2:
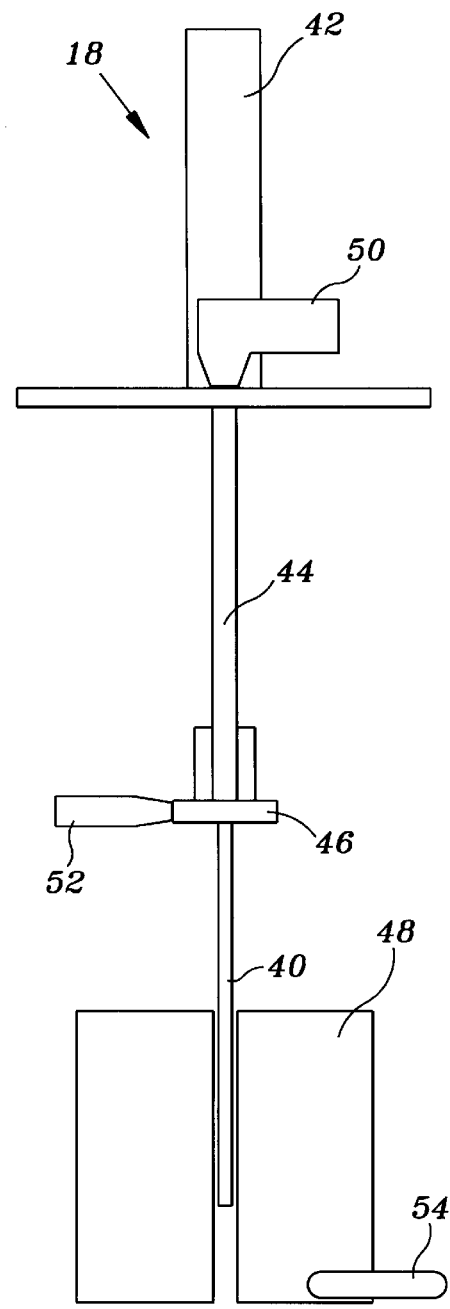
FIG. 2 is a schematic diagram illustrating a workstation of a stretch blow molding machine in accordance with the present invention.

Referring to FIG. 2, a workstation 18 is illustrated in block diagram form. Workstation 18 includes a stretch rod 40. A stretch rod air cylinder 42 causes a stretch rod actuator 44 to move up and down. Stretch rod actuator 44 is connected to a station yoke 46. Yoke 46 moves along two parallel rails (not shown) to ensure that stretch rod 40 moves in a straight line. Stretch rod 40 is also attached to stretch rod yoke 46. Stretch rod 40 moves in and out of a mold cavity 48. An important aspect of the present invention is the use of a stretch rod displacement transducer 50 to monitor the position of stretch rod yoke 46. Stretch rod displacement transducer 50 may include, for example, an ultrasonic, piezoelectric device. Such a device may comprise, for example, a sonic Omni Beam piezoelectric proximity sensor manufactured and sold by Banner Engineering. Transducer 50 may also include an acoustic reflector (not shown) mounted on stretch rod yoke 46 to facilitate the return of acoustic energy to transducer 50 in order to determine stretch rod 40 displacement. Transducer 50 may also include a photoelectric device, a laser device or any variation of a linear voltage displacement transducer.

Process air is introduced to stretch rod 40 by a fitting (not shown) also mounted on yoke 46. A process air pressure transducer 52 is connected to a process air fitting (not shown) to allow the determination of process air pressure in accordance with the present invention. Transducer 52 may comprise for example, a model MSP 400 manufactured and sold by Measurement Specialties, Inc.

Mold cavity 48 is temperature controlled utilizing chilled water. The temperature of the chilled water is sensed by a thermal sensor 54, such as for example, a thermocouple, resistance temperature detector or thermistor.

Transducers 50 and 52, and temperature sensor 54 provide output to process controller 22 which transmits data to modem 26. Modem 26 may comprise, for example, a model SRM6000 spread spectrum industrial radio modem manufactured and sold by Data-Linc Group.

Power source 20 may include a series of stackable power rails mounted on a stationary portion of machine 10. Pick-up shoes ride along the rails. Additionally, a slip ring can be attached to wheel 18. The slip ring is constructed such that brushes mounted on the fixed or stationary part of machine 10 contact the slip ring. The slip ring turns past the fixed brush which is fabricated of electrically conductive material. With the slip ring and brush combination there is an electrical circuit completed to the rotating portion of machine 10.

Additionally, power source 20 may include dc generator and dc-to-dc converter. The dc generator is geared to a ring installed on the machine 10. As the machine 10 drum begins to turn, the generator produces electricity. The output of the generator is regulated and filtered by a dc-to-dc converter. The generator stage of power source 20 utilizes a permanent magnet gear motor driven as a generator. This arrangement produces direct current with no battery being required on wheel 16.

It therefore can be seen that the present invention provides for monitoring in real time, critical stretch blow molding machine parameters.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. In a stretch blow molding machine including a rotating wheel having a plurality of workstations, each workstation having a mold cavity, a stretch rod mounted for movement with respect to the mold cavity and through which pressurized air is introduced into the mold cavity, and a fluid cavity containing fluid for chilling the mold cavity, a system for monitoring each workstation comprising:

means mounted to the workstation for monitoring the position of the stretch rod with respect to the mold cavity and for generating position data;

means disposed at each workstation for monitoring air pressure introduced through the stretch rod and for generating pressure data;

means disposed at each workstation for monitoring temperature of the fluid in the fluid cavity and for generating temperature data;

means for displaying said position data, pressure data, and temperature data; and a radio modem for continuously transmitting said data in real time from said monitoring means to said display means.

2. The system of claim 1 and further including a power source for generating power based upon rotation of the rotating wheel of the stretch blow molding machine.

\* \* \* \* \*